United States Patent [19]
Gorski

[11] 3,957,319
[45] May 18, 1976

[54] PILLOW BLOCK AND BEARING ASSEMBLY

[75] Inventor: Paul T. Gorski, Mishawaka, Ind.

[73] Assignee: Reliance Electric Company, Mishakawa, Ind.

[22] Filed: Jan. 29, 1975

[21] Appl. No.: 545,028

[52] U.S. Cl. .................. 308/187; 308/72; 308/194; 308/207 R
[51] Int. Cl.² .......................... F16C 1/24
[58] Field of Search ........... 308/187, 74, 189, 236, 308/194, 36.1, 207; 403/344

[56] References Cited
UNITED STATES PATENTS

| | | | |
|---|---|---|---|
| 3,108,839 | 10/1963 | Johnson | 308/207 R |
| 3,751,124 | 8/1973 | Hanson | 308/194 |
| 3,799,636 | 3/1974 | Kersting | 308/194 |

Primary Examiner—M. H. Wood, Jr.
Assistant Examiner—Richard A. Bertsch
Attorney, Agent, or Firm—Hobbs & Green

[57] ABSTRACT

A pillow block and bearing assembly having a housing with a lubricating chamber with a bearing disposed therein and with axially aligned holes on opposite sides for receiving a shaft. The bearing is disposed in the chamber and includes inner and outer races and rolling elements therebetween, and an adapter for securing the bearing to the shaft engages the inner race for forming a press fit between the adapter, inner race and the shaft. A threaded means including a plurality of jack screws for moving the inner race axially on the tapered surface of the adapter adjusts the clearance between the inner and outer races and the rolling elements, and a hydraulic system is included in the adapter which communicates with the tapered surface and the inner surface of the inner race for releasing the adapter from the inner race and shaft when the threaded means has been loosened to permit axial movement between the inner race and the adapter. A window having a closure is preferably included in the side of the housing to permit observation of the bearing when an adjustment is being made with the jack screws.

12 Claims, 7 Drawing Figures

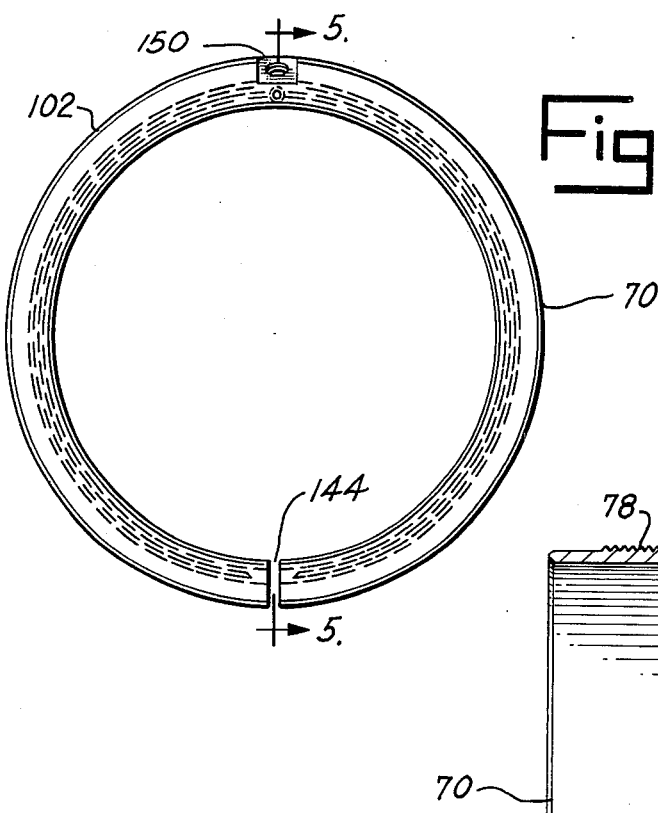
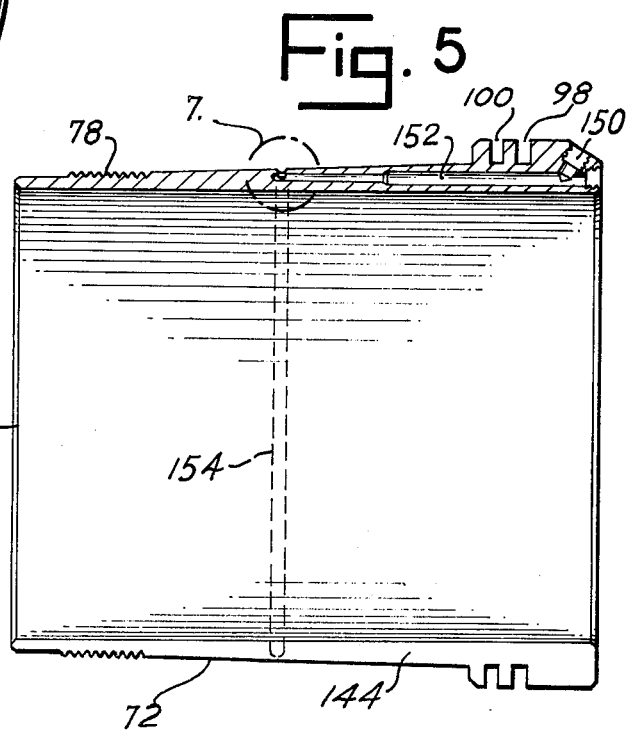
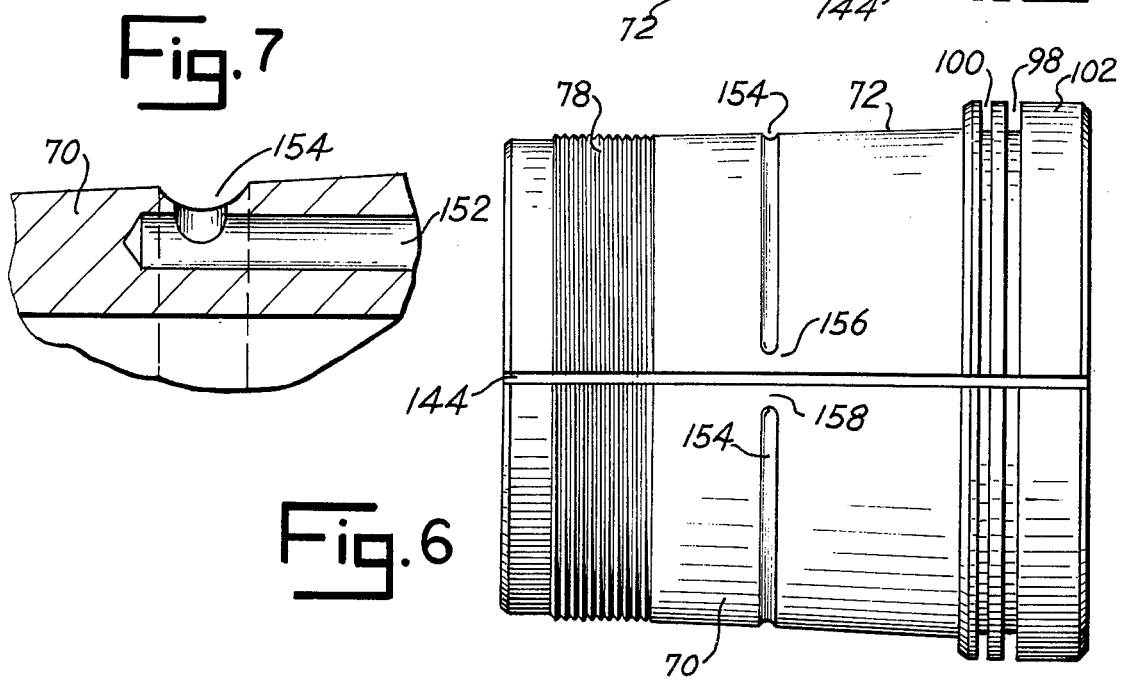

PILLOW BLOCK AND BEARING ASSEMBLY

In the use of the conventional pillow block and bearing assembly, the normal practice is to mount the bearing on the shaft and then assemble the pillow block housing in place over the bearing. In order to facilitate the assembly operation, the housing is often constructed of two sections which are placed over the bearing after it has been mounted on the shaft and are then bolted together to form the complete housing. This type of assembly has several inherent disadvantages, including contamination of the bearing and parts of the pillow block housing and seals, and the inconvenience of assembling the bearing and pillow block on site rather than in the fabricating plant where assembly operation, lubrication and the environment can be effectively controlled. Attempts have been made in the past to preassemble the bearing and pillow block and then mount the assembled unit on the shaft, this having been done with the use of a split, tapered adapter disposed between the bearing and the shaft, and tightened onto the shaft by being forced endwise in the bearing to form a press fit with the shaft and the inner race of the bearing. The bearing lubricant was then added to the pillow block after the bearing and pillow block assembly were fully installed on the shaft. The adapters tended to adhere to the shaft and inner race and consequently were often difficult to loosen when removing the bearing and pillow block assemblies. Nuts threaded onto the adapter have been used for tightening and loosening the adapters, and hydraulic fluid forced into the interfaces between the adapter and the shaft and inner race has been tried. Neither the use of nuts nor hydraulic fluid has been satisfactory in the past to perform the loosening operation, in that insufficient force could be applied with the nuts to readily loosen the adapter, and the hydraulic fluid, applied in the loosening operation to the shaft, sometimes prevented a firm grip between the adapter and shaft after the assembly had been installed. It is therefore one of the principal objects of the present invention to provide a preassembled pillow block and bearing in which the lubricant for the bearing is sealed in the assembly and the assembly is secured to the shaft by an adapter, which includes a mechanical means for securing the adapter to the shaft and inner race of the bearing and a hydraulic means for disengaging the adapter from the inner race when the assembly is removed from the shaft.

Another object of the invention is to provide a pillow block and bearing assembly having a one piece housing and a tapered adapter for securing the assembly to a shaft, in which the adapter is used to engage and expand the inner race of the bearing and thereby adjust the clearance between the rolling elements and inner and outer races, and in which an opening is provided for observing and measuring the adjustment.

Still another object of the invention is to provide in an assembly of the aforesaid type, a sealed bearing housing used in combination with a tapered adapter and in which hydraulic fluid means is utilized to release the adapter from the inner race without adversely affecting the gripping characteristics of the adapter on the shaft.

A further object is to provide a prelubricated pillow block and bearing assembly which can be easily installed on a shaft and removed therefrom in assembled condition, thereby avoiding contamination of the bearing and lubricant, and in which the bearing can accurately be adjusted during or after installation while the bearing is in its fully lubricated condition.

Additional objects and advantages of the present invention will become apparent from the following description and accompanying drawings, wherein:

FIG. 4 is an end elevational view of an adapter for securing the pillow block and bearing assembly to a shaft;

FIG. 5 is a longitudinal cross sectional view of the adapter shown in FIG. 4, the section being taken on line 5 — 5 of the latter figure;

FIG. 6 is a side elevational view of the adapter shown in FIG. 5; and,

FIG. 7 is an enlarged fragmentary cross sectional view of the adapter, the section being taken at the circle indicated by numeral 7 on FIG. 5.

Figure 1:
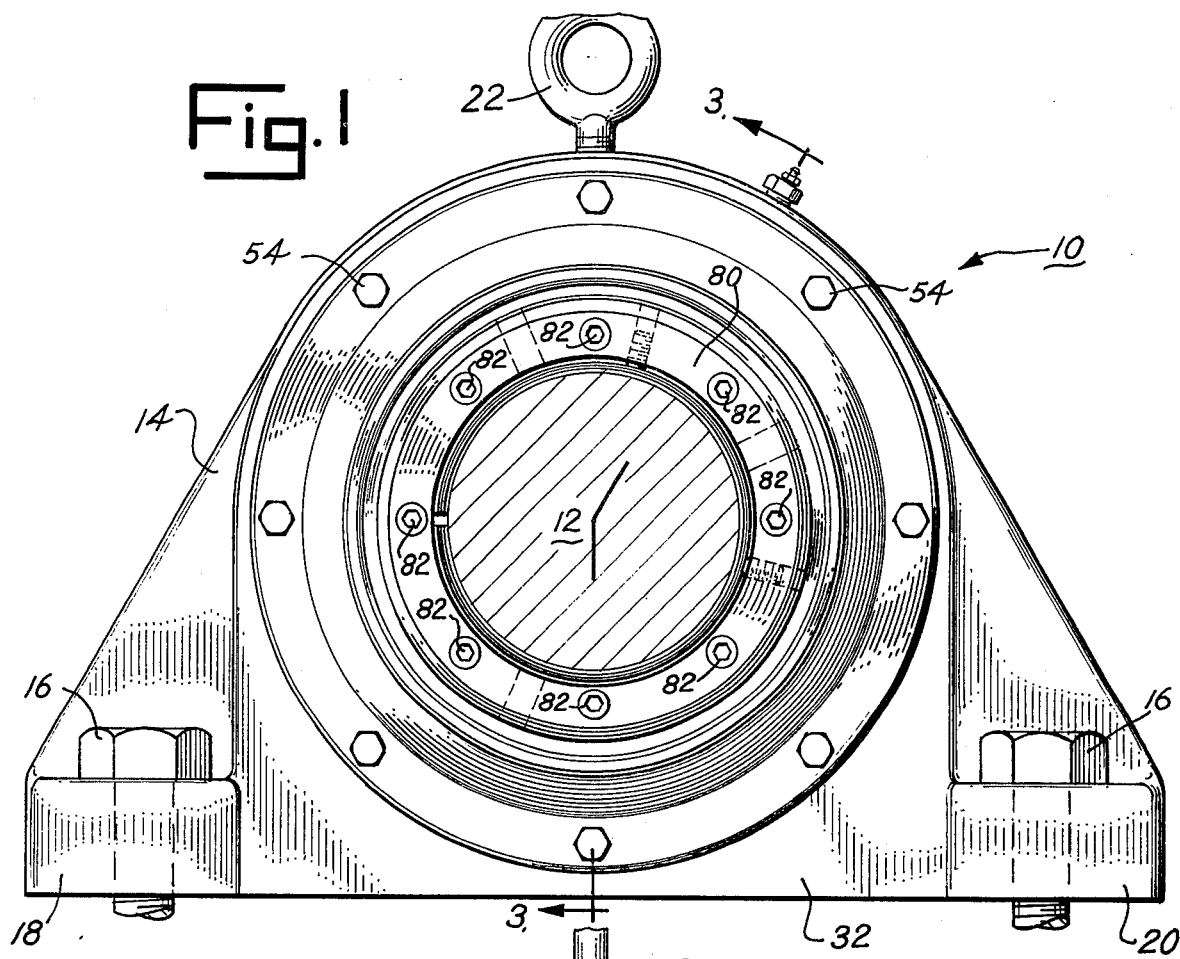
FIG. 1 is an end elevational view of the present pillow block and bearing assembly showing the assembly mounted on a shaft.

Referring more specifically to the drawings, numeral 10 indicates generally the present pillow block and bearing assembly mounted on a shaft 12 and having a housing 14 secured to a supporting structure by a plurality of bolts 16 extending downwardly through flanges 18 on one side of the housing and flanges 20 on the opposite side of the housing. An eye 22 threaded into an opening in the upper side of the housing is used for lifting the assembly, since the type shown is intended for use in relatively large installations and on equipment having a large shaft 12. While the present invention is intended principally for use in large bearings, it has application and advantages in other size bearings.

The housing 14 has an annular body 30 formed integrally with a base 32, preferably of cast iron, and contains an annular chamber or cavity 34 in which is mounted a bearing 36, the bearing having an inner race 38, an outer race 40, rollers 42 and a cage 44. Chamber 34 is closed on opposite sides by rings 50 and 52, ring 50 being secured to the side of body 30 by a plurality of bolts 54 spaced around the periphery of the ring, and ring 52 being secured to the side of the body by a plurality of bolts 56 spaced around the periphery of the ring 52. The bolts 54 and 56 extend through holes in the respective rings and into threaded holes 58 and 60. The two races 38 and 40 are steel and race 38 may be expanded to adjust the clearance between the rolling elements and the races without permanently distorting or deforming the race, as will be more fully explained hereinafter.

Figure 3:
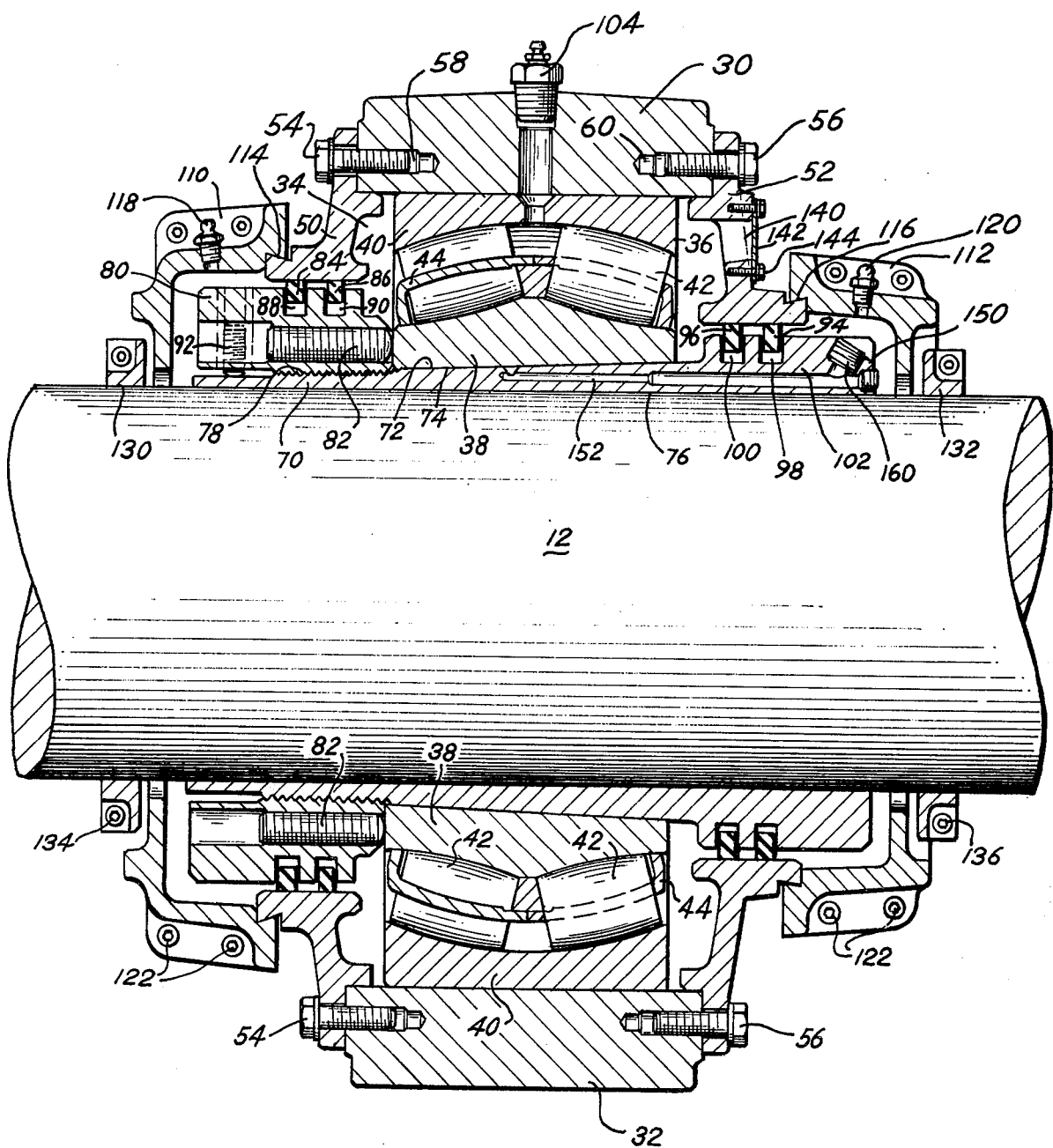
FIG. 3 is a vertical cross sectional view of the pillow block and bearing assembly shown in the preceding figures, the section being taken on line 3 — 3 of FIG. 1.

The bearing and pillow block assembly is mounted on shaft 12 by an adapter 70 disposed within the housing between the outer surface of the shaft and the inner surface of race 38. The adapter has a tapered surface 72 which engages a correspondingly tapered inner surface 74 of the inner race, and the adapter has a straight inner surface 76 for engaging the straight cylindrical surface of shaft 12. The left hand end of the adapter as viewed in FIG. 3 is threaded at numeral 78 for receiving a nut 80 or other threaded means having a plurality of jack screws 82 spaced around the periphery and extending therethrough. The inner ends of jack screws 82 engage the edge of inner race 38 and provide a microadjustment of the bearing when the bearing is mounted on a shaft.

The lubricant chamber or cavity 34 is sealed on the left hand side as viewed in FIG. 3 by two seals 84 and 86 disposed in grooves 88 and 90, respectively, in the outer surface of nut 80, the outer periphery of the two seals engaging the inwardly facing surface of ring 50 and forming an effective lubricant seal therebetween. After an adjustment of nut 80 has been made, it is held in adjusted position by one or more set screws 92 extending inwardly from the periphery and engaging the outer surface of adapter 70. The chamber or cavity 34 is sealed on the right hand side by seals 94 and 96 disposed in annular grooves 98 and 100, respectively, in the periphery of the enlarged end 102 of the adapter. The outer peripheries of the two seals engage the inwardly facing surface of ring 52 and form an effective lubricant seal therebetween. Hence, after the nut has been assembled in place in ring 50 with seals 84 and 86 in contact with ring 50, and the adapter assembled in place with seals 94 and 96 in contact with ring 52, cavity 34 becomes essentially lubricant leak-proof, thus permitting the bearing to be prelubricated at the time it is assembled in the fabricating plant. The lubricant is injected into cavity 34 through a fixture 104.

Figure 2:
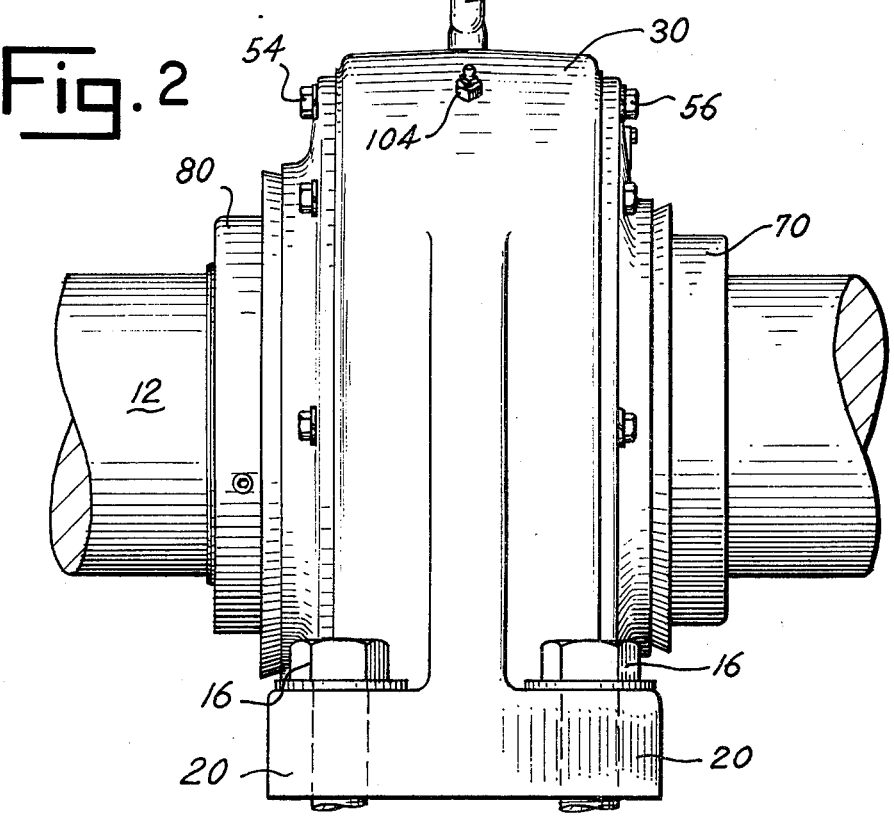
FIG. 2 is a side elevational view of the pillow block and bearing assembly and shaft shown in FIG. 1.

Auxiliary seals 110 and 112 are preferably provided on the left and right hand sides of the housing, as viewed in FIG. 3, and are secured to rings 50 and 52, respectively, by interlocking structures 114 and 116. The lubricant may be injected into the cavities of the auxiliary seals through lubricating fixtures 118 and 120, respectively. The two auxiliary seals are preferably constructed in two sections and secured together by a plurality of screws 122. FIGS. 1 and 2 show the pillow block without the auxiliary seals mounted thereon. Collars 130 and 132, preferably consisting of two sections secured together by screws 134 and 136, respectively, are clamped to the shaft at opposite ends of the assembly to act as flingers and to form an additional labyrinth seal.

In order to permit the inspection of the bearing when an adjustment is being made, an opening 140 is provided in ring 52, and may be provided in ring 50 if desired, the opening being closed during normal operation of the bearing by a plate 142 secured to ring 52 by a plurality of screws 144. When plate 142 has been removed, the bearing and the clearance between the races and rolling elements can easily be observed and, if an adjustment is required, screws 82 may be tightened or loosened to provide the proper clearance between the rolling elements and the races.

Adapter 70, consisting of essentially a tapered sleeve, has threads 78 on the small end and an enlarged portion at the opposite end, and is split longitudinally at numeral 144. When nut 80 is tightened on the end of the adapter, the adapter is urged toward the left hand side of the bearing, thus causing tapered surfaces 72 and 74 to firmly engage one another and to cause the adapter to firmly grip shaft 12, thus forming a rigid connection between the shaft and inner race 38. The adjustment of jack screws 82 can then be made to expand the inner race to provide the desired clearance between the inner and outer races and the rolling elements therebetween.

Since an effective and firm gripping action is formed by the press fit resulting from the tightening of nut 80 and jack screws 82, the adapter will not readily loosen and release the inner race 38 or shaft 12. In order to facilitate the loosening of the adapter and the disassembling of the pillow block and bearing assembly, a hydraulic system indicated generally by numeral 150 is provided in the adapter. This system includes a longitudinal hydraulic fluid passage 152 and a peripheral groove 154 extending substantially around the entire outer tapered surface of the adapter but spaced from slot 144 as indicated at numerals 156 and 158, to provide closed ends to the peripheral groove 154. A fixture 160 is connected to passage 152 and is threaded to receive a hose connection from a hydraulic system for injecting hydraulic fluid under relatively high pressure into passage 152 and groove 154. Thus when nut 80 and jack screws 82 have been loosened, i.e. backed away from the adjacent edge of inner race 38, hydraulic fluid under pressure forced into passage 152 and groove 154, reacting against the tapered surfaces 72 on the inner race, forces the bearing to the left, thus releasing the inner race and housing of the pillow block so that the assembly can be easily removed from the shaft. It is preferable that no lubricating or hydraulic fluid passages extend to the faces of the adapter and shaft since the fluid interferes with an effective gripping action between the adapter and surface of the shaft.

In the assembly and operation of the present pillow block and bearing assembly, the bearing is assembled in cavity 34 and the two end rings 50 and 52 are secured in place. Adapter 70 is inserted into the assembly with tapered surface 74 of the adapter contacting the tapered surface 72 of the inner race 38. Nut 80 is then threaded onto the threaded portion 78 of the adapter and tightened in place. Jack screws 82 are tightened to apply additional pressure on the tapered surfaces 72 and 74 and sufficient pressure to cause an expansion of inner race 38 to make an adjustment between the inner and outer races and the rolling elements. The amount of adjustment in the bearing is observed by removing plate 142 from opening 140, and the bearing is lubricated by injecting lubricant into chamber or cavity 34 through fixture 104. After the assembly has been secured to the shaft and the adjustment of the bearing has been made as described herein, auxiliary seals 110 and 112 and collars 130 and 132 are secured in place, and a lubricant is injected into the auxiliary seal through fixtures 118 and 120.

When the pillow block and bearing assembly is to be removed from the shaft, the two auxiliary seals are removed and jack screws 82 and nut 80 are loosened, and a hydraulic hose is connected to fixture 160. When hydraulic fluid is admitted under pressure into passage 152 and groove 154, it reacts against the tapered surface 72, thereby causing the bearing to move to the left sufficiently to release the effective pressure applied by tapered surface 74 on tapered surface 72. When the adapter has been thus released, the assembly can readily be removed from the shaft without the application of a lubricant or hydraulic fluid to the inner surface of the adapter and outer surface of the shaft.

It is seen that the foregoing pillow block or bearing assembly can be fully assembled, with full lubrication of chamber or cavity 34, and the adapter loosely mounted in the inner race. When the assembly is to be installed on a shaft, the loose adapter will readily slip onto a shaft and is tightened in place in the manner previously described herein. Thus the entire pillow block and bearing assembly can be assembled in the fabricating plant and the installing operation completed without disassembling it, thus precluding the possibility of accidental contamination of the lubricant or improper assembly of the principal parts thereof.

While only one embodiment of the present pillow block and bearing assembly has been described in detail herein, various changes and modifications may be made without departing from the scope of the invention.

I claim:

1. A pillow block and bearing assembly comprising a housing having a lubrication chamber therein and opposed openings for receiving a shaft, a bearing disposed in said chamber and having inner and outer races and rolling elements therebetween, an adapter extending axially through said housing openings and having a longitudinal split therethrough and a tapered annular surface for engaging the inner surface of said inner race, a screw means disposed on one end of said adapter engaging said inner race for urging the tapered surface of said adapter into engagement with said inner race, means defining hydraulic fluid passages in said adapter for releasing said adapter from said inner race when said screw means has been loosened, and sealing means at each of said openings in said housing between the housing and adapter for sealing lubricant in said chamber.

2. A pillow block and bearing assembly as defined in claim 1 in which said adapter has a large end and a small end and said threaded means is disposed on said small end, and a fluid inlet port is provided in the large end of said adapter for communicating with said hydraulic fluid passages.

3. A pillow block and bearing assembly as defined in claim 1 in which said threaded means includes a plurality of jack screws which adjust the diameter of said inner race by urging said inner race axially on the tapered surface of said adapter.

4. A pillow block and bearing assembly as defined in claim 3 in which an opening is provided in the side of said housing for observing the clearance between said races and said rolling elements when an adjustment is made by said screw threaded means.

5. A pillow block and bearing assembly as defined in claim 4 in which said opening is closed by a removable plate secured to the side of said housing.

6. A pillow block and bearing assembly as defined in claim 4 in which said adapter has a large end and a small end and said threaded means is disposed on said small end, and a fluid inlet port is provided in the large end of said adapter for communicating with said hydraulic fluid passages.

7. A pillow block and bearing assembly as defined in claim 6 in which said hydraulic passages communicate only with said tapered surface and include a peripheral groove extending partially around said adapter.

8. A pillow block and bearing assembly as defined in claim 1 in which said hydraulic passages in said adapter communicate only with said tapered surface and include a peripheral groove extending partially around said adapter.

9. An adapter for a pillow block and bearing assembly as defined in claim 1 in which said hydraulic passages communicate only with said tapered surface and include a peripheral groove extending partially around said adapter.

10. In a pillow block and bearing assembly having an inner race, a longitudinally split adapter having a large and a small end and having an annular tapered external surface therebetween for engaging the inner surface of the bearing race, an annular threaded portion on said small end of the adapter a screw means disposed on said threaded portion, an annular sealing part on the periphery of said screw means, an annular sealing part on the periphery of said large end of said adapter, means defining a fluid passage extending longitudinally from a point near one end of the adapter for hydraulic fluid, and a passage connecting said passage with said tapered surface.

11. An adapter for a pillow block and bearing assembly as defined in claim 10 in which an inlet port is provided in the large end of said adapter for communicating with said hydraulic fluid passages.

12. An adapter as defined in claim 10 in which said screw means mounted on said threaded portion includes a nut and a plurality of spaced jack screws in said nut for engaging the side of the inner race for urging the said race and said adapter axially relative to one another.

* * * * *